May 9, 1933. N. E. WAHLBERG 1,907,910
METHOD OF MAKING AUTOMOBILE FRAMES
Original Filed Aug. 31, 1928
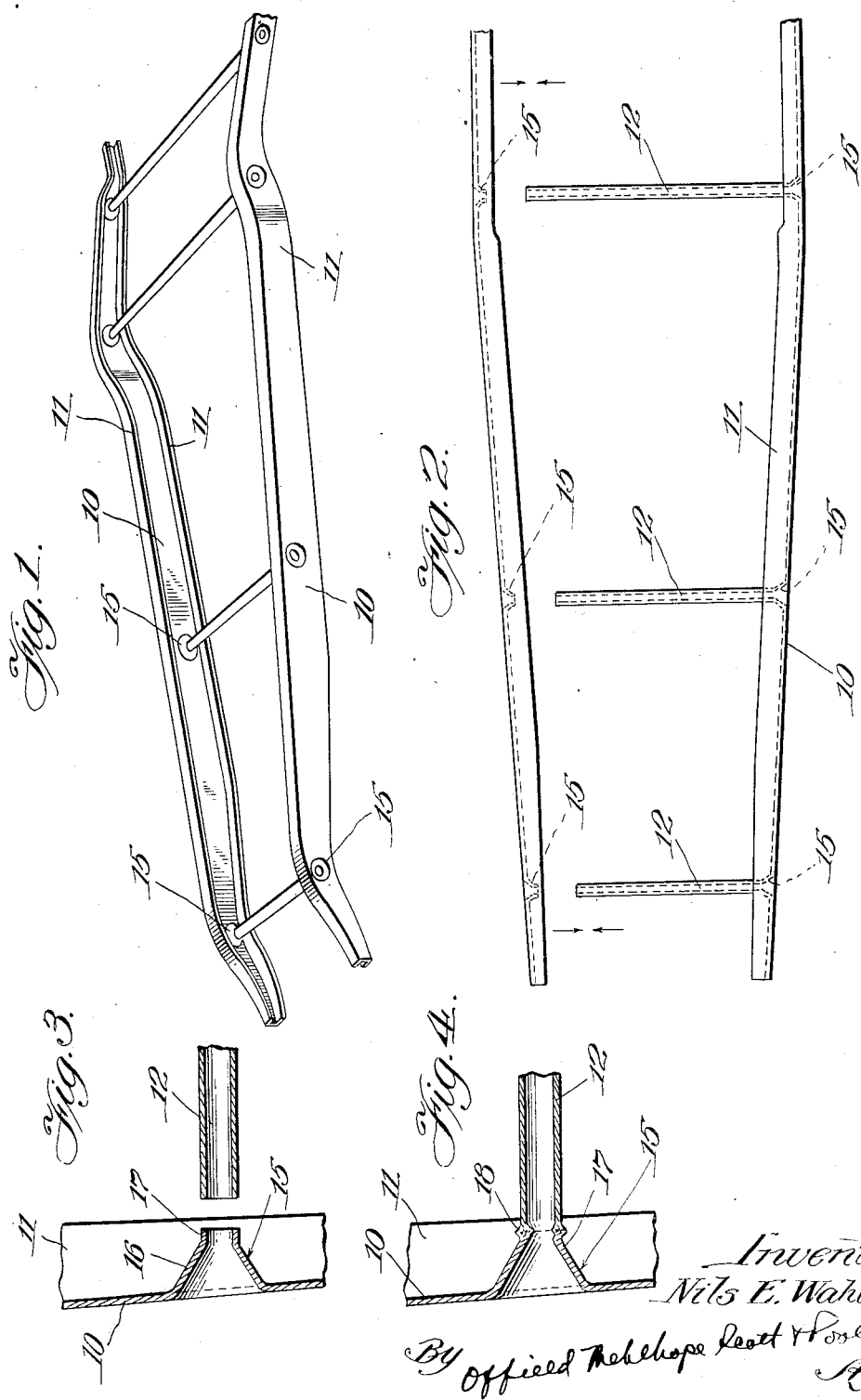

Patented May 9, 1933

1,907,910

UNITED STATES PATENT OFFICE

NILS ERIK WAHLBERG, OF KENOSHA, WISCONSIN, ASSIGNOR TO THE NASH MOTORS COMPANY, OF KENOSHA, WISCONSIN, A CORPORATION OF MARYLAND

METHOD OF MAKING AUTOMOBILE FRAMES

Original application filed August 31, 1928, Serial No. 303,155. Divided and this application filed February 9, 1931. Serial No. 514,429.

This invention relates to improvements in frames and more particularly to pressed steel automobile frames and the method of welding the same whereby the side frames and cross members are connected into an integral piece.

The object of the invention is to provide an improved construction and arrangement of parts including tubular cross members and the method of welding them to the side frame members, whereby an especially strong and rigid construction is obtained, and said frames may be produced with greater economy in less time and without the attendant difficulty of warping or getting out of shape, as is usually the case with ordinary riveted frame structures. Other objects of the invention will appear from time to time as the description proceeds.

This application is a division of my prior application, Serial No. 303,155, filed August 31, 1928, and issued as Patent No. 1,893,721 and relates more particularly to the method of welding the several cross members to the side frames in a single operation.

The invention may best be understood by reference to the accompanying drawing, in which Figure 1 is a perspective view of an automobile frame constructed in accordance with my invention.

Figure 2 is a plan view of a portion of the frame showing it in the process of manufacture and illustrating the method whereby the several cross members may be joined to a side frame in one welding operation.

Figure 3 is an enlarged view showing the arrangement of one of the cross frame members before it is welded to the side frames.

Figure 4 is a view similar to Figure 3, but showing the parts after they are welded.

Referring now more particularly to details of the invention illustrated in the drawing, it will be seen that I provide an automobile frame made up of a plurality of pressed-steel side frame members 10, 10, having inwardly formed upper and lower flanges 11, 11, of the usual form, to which tubular cross members 12, 12 are directly welded. I am aware that it has been heretofore proposed to weld tubular cross members to flanged end members which in turn are welded or riveted to side frame members, but in the present invention I initially form the side frame members during the forming or pressing operation with nipples suitable to be directly welded to tubular cross members, as will now be described.

In carrying out my invention, I provide an improved form of nipple, indicated at 15, 15, each comprising a relatively deep depression in the outer face of the side frame members 10, with its walls 16 converging inwardly in frusto-conical shape to an extension 17 of the proper size and shape to be welded directly to its respective cross member 12. In the preferred form shown, the cross members 12 are of circular cross section and are butt-welded to the nipples 15, and in this form the section 17 is of substantially the same thickness as the adjacent ends of the cross members 12.

It will be understood that the shape of the nipples 15, 15 is such as to readily lend themselves to be drawn in an ordinary pressing operation and preferably, during the same operation in which the marginal flanges 11, 11 are formed, which pressing operations will be well understood by those skilled in the art.

Referring now to the method of welding the cross members 12 to the nipples 15, Figure 2 indicates a preferred method whereby all of the cross members 12 may be welded in a single operation by the electrical resistance method well known in the art. The cross nipples 12, 12 and the corresponding nipples 15, 15 are mounted in any suitable guides so as to be moved toward each other, and at the same time, electrical connections may be completed through the side frame and the several cross members so as to pass a current simultaneously across the several joints, and thus form a series of butt-welds 18, 18 in the usual manner.

As will be understood by those skilled in the art, all of the butt-welds 18, 18 formed as above described, may be readily formed of uniform strength during a single welding operation, owing to the well-established phenomenon wherein the welding currents through a plurality of welding points tend to equalize themselves due to the increased resistance produced at any one of the points which might initially tend to pass more current than the remaining welding points in the circuit. During the welding operation the adjacent ends of portions 17 and 12 are reduced somewhat in length, in the usual manner, to form a welded joint 18.

Among the advantages of the invention above described is the ease and simplicity of construction whereby all riveting, bolting or the like is entirely eliminated, and the frame is welded into a single integral piece having required strength and rigidity at the point of connection of the cross members and the side frame. The nipples 15, 15 are readily formed during the pressing operation of the side frame and are of such shape as to resist the stresses imposed upon them.

As a further advantage of my improved method of forming a plurality of welds in a single operation, it will be understood that the frame so formed is not subject to warping or getting out of shape as is the case where the several joints may be welded separately, or as is especially noticeable in ordinary forms of riveted frame structures, wherein a large proportion of such latter frames are found to be twisted out of proper shape, no matter how great care is taken in their fabrication.

I claim:

The method of forming a steel frame consisting of pressed steel side frame members and a plurality of tubular cross members, which consists in pressing the upright webs of said side frame members at longitudinally spaced points into nipples having inwardly converging intermediate walls and a tubular open end, and simultaneously moving a plurality of said tubular cross members into endwise engagement with the tubular ends of their respective nipples to weld the same in a single operation.

Signed at Kenosha, Wis., this 6th day of February, 1931.

NILS ERIK WAHLBERG.